United States Patent [19]

Schweikert

[11] Patent Number: 4,732,077
[45] Date of Patent: Mar. 22, 1988

[54] AIR SPRING

[75] Inventor: Willi Schweikert, Heidelberg, Fed. Rep. of Germany

[73] Assignee: Firma Carl Freudenberg, Weinheim/Bergstr, Fed. Rep. of Germany

[21] Appl. No.: 776,812

[22] Filed: Sep. 17, 1985

[30] Foreign Application Priority Data

Sep. 21, 1984 [DE] Fed. Rep. of Germany ....... 3434659

[51] Int. Cl.⁴ ............................................. F15B 11/10
[52] U.S. Cl. ........................................ 91/433; 91/443; 91/454; 137/116.3; 137/116.5; 137/627.5
[58] Field of Search ......................... 91/433, 443, 454; 137/116.5, 116.3, 627.5

[56] References Cited

U.S. PATENT DOCUMENTS 3,420,257  1/1969  Lansky et al. .................... 137/116.5
3,460,559  8/1969  Pullen et al. ..................... 137/116.5
3,545,471  12/1970  Taplin ............................. 137/116.5
3,955,590  5/1976  Palm et al. ....................... 137/116.5

Primary Examiner—James C. Yeung
Attorney, Agent, or Firm—Felfe & Lynch

[57] ABSTRACT

A pressure controller for an air spring having a gas-filled, variable interior space for spring action between relatively-vibrating bodies has interconnected intake and outlet valve stems for opposite valve action and an actuating piston responsive to the gas pressure in the variable interior space and an oppositely-acting compression spring for moving the valve stems. High pressure in the variable interior space opens the outlet valve to vent the variable interior space to the atmosphere and low pressure in the variable interior space opens the inlet valve to supply compressed gas to the variable interior space from a reservoir.

6 Claims, 2 Drawing Figures

AIR SPRING

BACKGROUND OF THE INVENTION

The invention relates to an air spring.

A known air spring for use between relatively-vibrating bodies has a gas-pressurized, variable interior space connected to a gas outlet valve and to a gas intake valve which, in turn, is connected to a compressed-gas reservoir. Each of the intake and outlet valves has a valve seat and a positioning element (hereafter called a stem) elastically pressed thereunto. At least one actuating piston actuates (opens and closes) not more than one of the two valves. For this, a face of the actuating piston is subjected to the gas pressure of the interior space and displaceable in a housing in the direction for actuating the valve, the seat of the other valve being formed by the housing.

For one example, German patent publication DAS No. 12 82 475 discloses a pneumatically-damped air-suspension system in which a double-acting valve connects the variable interior space of an air spring to an equalizing space. The valve is actuated by vibration-induced pressure differentials between the interior space of the air spring and the equalizing space to provide some compensation for the over- or under-pressures in the air spring producing the pressure differentials.

For another example, another air spring is described in U.S. Pat. No. 2,965,372. In it, the variable interior space for spring action between relatively-vibrating bodies is formed by one side of a double-ended piston and cylinder combination. The one side of the piston is acted on by compressed gas at a mean pressure, but when external, vibration forces change the variable interior space and, thus, its pressure, this displaces the piston and, thereby, actuates a valve which adjusts a gas pressure acting on the other, side of the piston to the gas pressure then effective on the one, first-mentioned side. This effectively-reciprocal adjustment of the gas pressures on both sides of the piston is effected by supplying gas at a pressure above the mean pressure from a surge tank or by exhausting gas to the atmosphere. However, the valve actuation is dependent on the instantaneous piston position and, thus, makes no allowance for the phase shift of the instantaneous gas pressure relative to the associated piston position which becomes significant when higher-frequency vibrations are introduced into the air spring. The valve actuation then is incorrect and results in poor isolating action.

SUMMARY OF THE INVENTION

An object of the invention is, therefore, to improve an air spring of the type described above to obtain better isolation of high-frequency vibrations than with a passive air spring and better damping of vibrations in the resonance region than with known actively-compensated air springs.

Another object of the invention is to permit the spring characteristics of an air spring to be selectively modified, for example for adapting it to predictable peculiarities resulting from its use in a motor vehicle.

To these and other ends, the air spring of the invention has one and, preferably, only one working space which, hereinafter, will be called the interior space. When filled with gas at a mean pressure, it is variable with relatively-vibratible bodies connected to the air spring, for example, the frame and body of a motor vehicle and supporting steering control arms of a wheel therefor, for spring action therebetween. The gas-filled, variable interior space of the air spring can, therefore, be simple in construction, for example, a hollow rubber body. Its internal pressure is, however, selectively variable as a function of the vibrations introduced. To this end, a pressure controller selectively connects the interior space of the air spring to a compressed-gas reservoir or a vent to atmosphere.

An important feature of the pressure controller is that the actual pressure in the interior space of the air spring serves as a control pressure for actuating intake and outlet valves which selectively connect the interior space of the air spring to the compressed-gas reservoir and vent to atmosphere. When the pressure in the interior space rises, the outlet valve is opened to exhaust gas therefrom to the atmosphere and, thereby, prevent a further increase of the pressure and, when the pressure drops, the intake valve is opened to permit compressed gas from the reservoir to flow into the interior space and, thereby, prevent a further pressure drop. This results in excellent compensation of the vibrations introduced into the air spring by the relatively-vibratible bodies.

BRIEF DESCRIPTION OF THE DRAWINGS

The operation and construction of a merely-illustrative, preferred embodiment will now be described with reference to drawings, in which.

DESCRIPTION OF CHARACTERISTICS AND PREFERRED EMBODIMENTS

Figure 1:
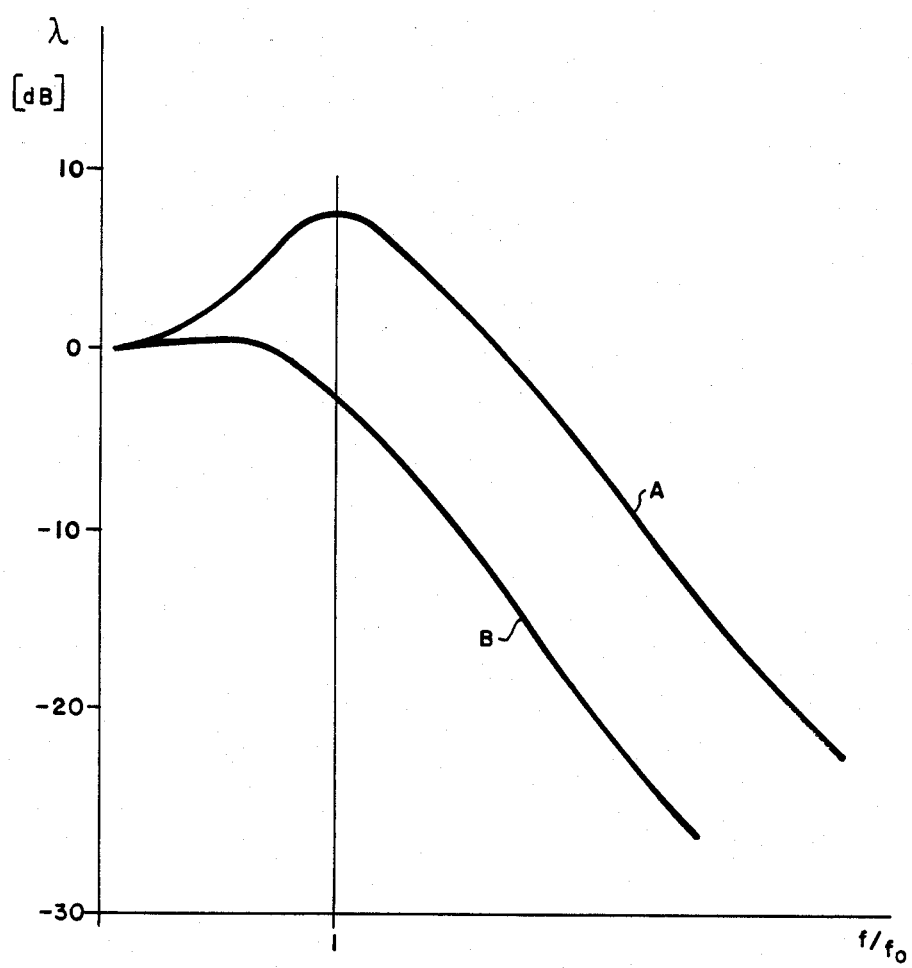
FIG. 1 is a comparative nomograph of the transfer functions of air springs according to German patent publication DAS No. 12 82 475 and the invention.

Comparison of the transfer function A of the previously-described air spring of published German patent application DAS No. 12 82 475, discussed above, with that, B, a design according to the invention in FIG. 1 shows that the prior-art device amplifies the vibration-induced spring excursion in the region of resonance but that this is not the case with the device of the invention. Moreover, the invention provides better isolation of high-frequency vibrations, as shown to the left in the Fig., when a pressure controller of sufficiently high responsiveness is used. "Sufficiently high" in this context means that the natural frequency of the valve stems in the pressure controller is higher than the frequency of operation-induced vibrations in the air spring. This requirement is readily met in practice by the use of pressure controllers of relatively-small size, for example, which is also consistent with the trend toward weight reduction. With the air spring of the invention, valve-actuating, compensating pressure variations in the interior space thus occur also in the high-frequency region.

To secure these advantageous characteristics in an air spring according to the invention, the intake and outlet valves are not only arranged and designed in the manner described but also, preferably, designed with respect to their responsiveness and dynamic behavior.

Figure 2:
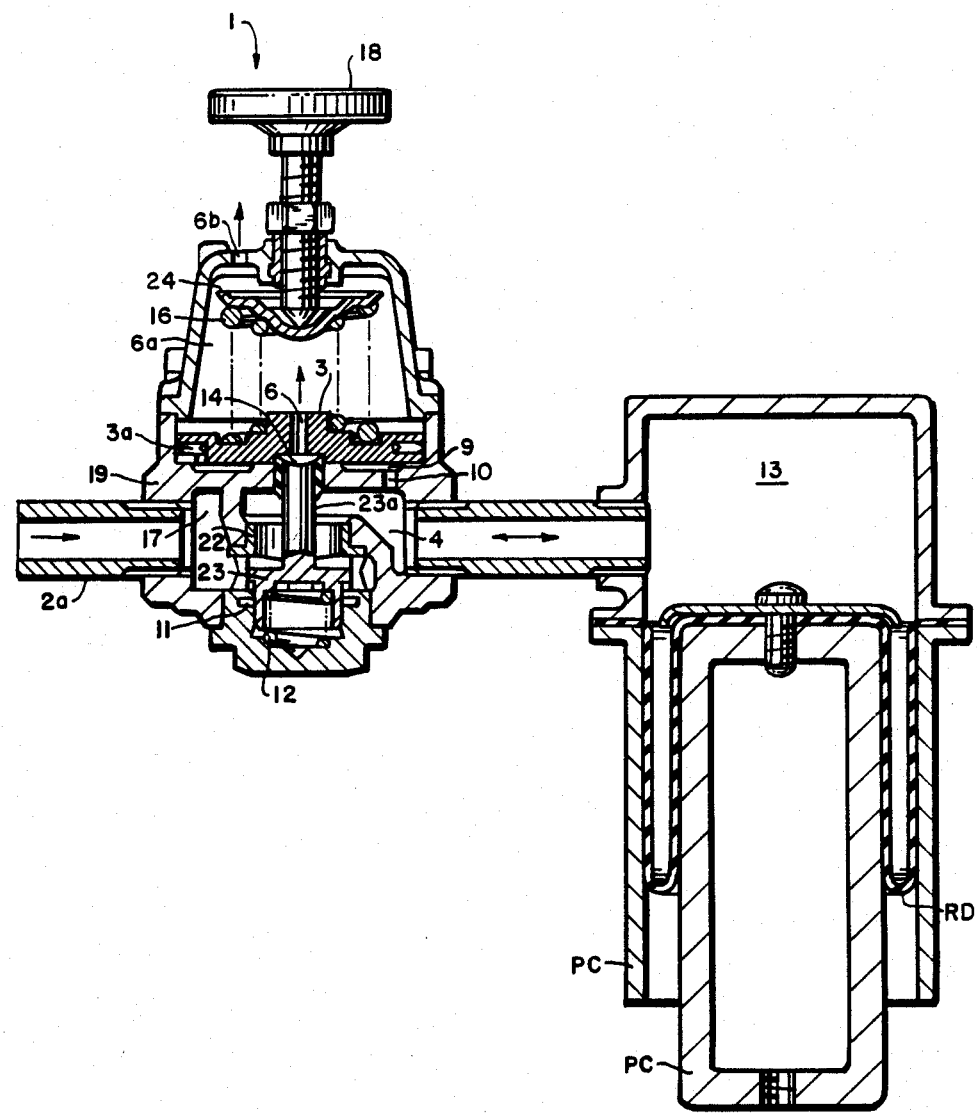
FIG. 2 is an elevation, partly in section, of a preferred embodiment.

The preferred embodiment of an air spring shown in FIG. 2 has a gas-filled, variable interior space 13 defined by a piston and cylinder PC connected by a rolling diaphragm RD. The piston and cylinder may be connected between a wheel and the frame and body of a motor vehicle (not shown) as the suspension for accommodating relative vibrations therebetween, for example.

The interior space 13 of the air spring is connected to a pressure controller at 1 by a line 2. The pressure controller is also connected to a compressed-gas reservoir (not shown) by a line 2a. The pressure controller has an outer housing 19. The compressed gas from the compressed-gas reservoir (not shown) is conveyed by line 2a to a surge chamber 17 in the housing. The surge chamber is connected by an intake valve 11 to an antechamber 4 which is connected to the variable interior space 13 by the line 2. The seat 22 of the intake valve is a fixed part of the housing 19. The stem 23 of the intake valve is supported on a low-tension compression spring 12 which presses it onto the valve seat 22.

The stem 23 of the intake valve 11 has a pin projection 23a which projects, vertically upward as shown, to form also the stem of an intake valve 14 having a cooperative seat in one face of an actuating piston 3. A vent line 6 penetrates the actuating piston 3 from the seat for the intake valve 14 to a space 6a in the housing 19 which is vented to atmosphere by an opening 6b.

The actuating piston 3 is supported in the housing for motion axially of the stem pin projection 23a, in the vertical direction as shown, and is sealed to the housing by a sealing ring 3a. A rolling diaphragm (not shown) may be used in another embodiment (not shown) in place of the sealing ring 3a if pronounced ease of movement of the actuating piston is desirable as, for example, when the air spring is used to support a driver's seat in a vehicle.

One end of a compression spring 16 bears on the face of the actuating piston 3 opposite that with the seat for the intake valve 14. The other end of the compression spring 16 is supported on a spring retainer 24 that can be moved axially of the stem pin projection 23a and, thus, parallel to the actuating piston 3 by a set screw 18 threaded through the housing in the same direction to press the spring 16 with greater or lesser force. The force of the compression spring 16 on the actuating piston 3 can thus be adjusted.

The face of the actuating piston 3 with the seat for the intake valve 14 also bounds one side of a control chamber 9 in the housing 19. The control chamber 9 is connected to the antechamber 4 through an equalizing line 10 and, hence, to the interior space 13 of the air spring via line 2. The pressure in the interior space thus acts at all times on the face of the actuating piston 3 bounding the control chamber.

The principle of operation of the embodiment of FIG. 2 is as follows:

With the system completely exhausted, there is no super-atmospheric pressure in the interior space 13 of the air spring. Consequently, no super-atmospheric pressure acts on the face of the actuating piston 3 bounding the control chamber 9. The actuating piston is, therefore, moved toward the control chamber, downward as shown, by the compression spring 16 which engages its opposite face. This pushes valve stems 23a, 23 in the same direction to push the stem 23 of the intake valve 11 off its seat, as shown, against the force of a spring 12. Compressed gas from the compressed-gas reservoir (not shown) connected to line 2a therefore flows through the line and intake valve into line 2 and the interior space 13 of the air spring.

The resulting pressure rise in the interior space 13 of the air spring concomitantly raises the pressure in the control chamber 9 via equalizing line 10 and, consequently, increasingly compensates the force of the compression spring 16. The actuating piston 3 therefore gradually rises with the stem of the intake valve following its motion under the force of the spring 12. Thus, the intake valve 23 is gradually closed. When closed, the flow of gas into the interior space 13 of the air spring for a further pressure rise is stopped.

Let us now assume an operating condition such that the pressure in the interior space 13 of the air spring rises, i.e. the piston and cylinder PC are moved toward each other by the relatively-vibrating bodies (not shown) they are between to compress the gas in the interior space 13. This pressure rise is transmitted directly to the control chamber 9 via lines 2 and 10 and, hence, to the chamber-bounding face of the actuating piston 3 which, therefore, moves against the opposite spring 16. The stem 23a of the outlet valve cannot follow this movement of the actuating piston, however, because it is a projection of the stem 23 of the intake valve which is seated on its seat. As a result, stem 23a of the outlet valve 14 is separated from its seat on the actuating piston 3. Gas is thus able to flow from the interior space 13 through the line 2 and antechamber 4, about the projecting stem 23a of the outlet valve 14, and through the vent line 6 and housing space 6a for escape through vent 6b. The gas pressure in the interior space 13 and, thus, via lines 2 and 10, in the control chamber 9 then falls and the actuating piston 3 with the seat of the outlet valve 14 then moves towards stem 23a under the force of spring 16 to close the outlet valve.

Let us now assume an operating condition such that the pressure in the interior space 13 of the air spring drops, i.e. the piston and cylinder PC are moved away from each other by the relatively-vibrating bodies (not shown) they are between to de-compress the gas in the interior space 13. This pressure drop is transmitted, as before, to the chamber-bounding face of the actuating piston 3. The force of the compression spring 16 on the opposite face of the actuating piston 3 then is greater than the gas pressure acting on its chamber-bounding face to push the actuating piston 3 toward the stem 23a of the outlet valve 14, downward as shown. The seat of the outlet valve on the actuating piston 3 thus pushes its stem 23a similarly downward to displace the connected stem 23 of the intake valve 11 from its seat. More compressed gas is then able to flow into the interior space 13 of the air spring, as described before, to raise the pressure therein. When the pressure in the interior space and control chamber rises sufficiently to offset the force of the compression spring 16, the intake valve closes again.

Inasmuch as the operation of the intake and outlet valves depends on the force of the end of the compression spring 16 on the actuating piston 3, as described, adjusting this force of the compression spring 16 adjusts the operation of the pressure controller and thus the piston and cylinder PC. Turning the set screw 18 to vary the length of its threaded penetration into the housing 19 correspondingly positions the other end of the compression spring 16 with the spring retainer 24 on the end of the set screw in the housing and engaging the spring. This, of course, varies the force of the other end of the spring on the actuating piston and, therefore, adjusts the operation of the pressure controller and, thus, piston and cylinder of the air spring.

The pressure controller at 1 thus described is distinguished by very high reliability in service. Its operation assures that the two, relatively-vibrating bodies secured to the air spring will not transmit disturbing vibrations to each other and, thus, provides a riding comfort not attained in the past when used in conjunction with vehicle or vehicle seat suspension, for example.

The pressure controller is further distinguished by its very simple design and use of fewer parts than any other design known to have been employed up to now in such applications. Yet external modification of its operation characteristics is readily possible via the set screw or of a piston (not shown) acting in a similar fashion on the compression spring in another example (not shown) to change the height above ground of a motor vehicle suspended on the air spring, for example. The ability to do so is of great importance to motor vehicles to be used, not only on a road, but also in open country.

It will be appreciated that the instant specification and claims are set forth by way of illustration and not of limitation, and that various changes and modifications may be made without departing from the spirit and scope of the present invention.

What is claimed is:

1. An air spring and pressure controller for the air spring comprising, in combination:
    an air spring comprising an interior space which is variable in response to relatively-vibratable bodies between which the air spring is used for spring action when filled with a gas; and
    a pressure controller comprising:
    a housing;
    an actuating piston movably sealed in the housing and having a face for bounding one side of a control chamber in the housing, the face of the actuating piston having an outlet valve seat and vent means for venting gas to the atmosphere from the outlet valve seat through the actuating piston;
    gas line means for gas connecting the control chamber and, thereby, the outlet valve seat to the gas in the variable interior space of the air spring and, through an intake valve seat in the housing, for gas connecting the variable interior space of the air spring to a compressed-gas reservoir;
    a compression spring in the housing for spring force on the face of the actuating piston opposite that bounding the control chamber and having the outlet valve seat, thereby to move the actuating piston in response to the relative spring force and gas pressure in the control chamber; and
    an outlet valve stem and an intake valve stem, the outlet valve stem being seatable in the outlet valve seat on the actuating piston for outlet valve action on the vent means therethrough in response to the movement of the actuating piston, and the intake valve stem being seatable in the intake valve seat for intake valve action on the gas line means for connecting the variable interior space of the air spring to the compressed-gas reservoir, the intake and outlet valve stems being movable in the housing by the actuating piston and interconnected for opposite valve action thereupon, the movement of said intake and outlet valve stems having a natural frequency which is higher than the frequency of the variation of the interior space of said air spring.

2. The air spring and pressure controller of claim 1, and further comprising compression means in the housing varying the compression of the compression spring for varying its spring force on the actuating piston.

3. The air spring and pressure controller of claim 2, wherein the compression means comprises a set screw threaded through the housing and a spring retainer on the set screw in the housing for engaging the compression spring.

4. A method of controlling an air spring, comprising:
    varying an interior space of an air spring in response to relatively-vibratable bodies between which the air spring is used for spring action when filled with a gas;
    movably sealing an actuating piston in a pressure-controller housing, the actuating piston having a face for bounding one side of a control chamber in the housing, the face of the actuating piston having an outlet valve seat and vent means for venting gas to the atmosphere from the outlet valve seat through the actuating piston;
    gas-connecting the control chamber and, thereby, the outlet valve seat to gas in the variable interior space of the air spring and, through an intake valve seat in the housing, the variable interior space of the air spring to a compressed-gas reservoir;
    providing spring force on the face of the actuating piston opposite that bounding the control chamber and having the outlet valve seat with a compression spring in the housing, thereby to move the actuating piston in response to the relative spring force and gas pressure in the control chamber; and
    providing an outlet valve stem and an intake valve stem, the outlet valve stem being seatable in the outlet valve seat on the actuating piston for outlet valve action on the vent means therethrough in response to the movement of the actuating piston, and the intake valve stem being seatable in the intake valve seat for intake valve action on the gas line means for connecting the variable interior space of the air spring to the compressed-gas reservoir, the intake and outlet valve stems being movable in the housing by the actuating piston and interconnected for opposite valve actions thereupon, the movement of said intake and outlet valve stems having a natural frequency which is higher than the frequency of the variation of the interior space of the air spring.

5. The method of claim 4, and further comprising varying the compression of the compression spring for varying its spring force on the actuating piston with compression means in the housing.

6. The method of claim 5, wherein varying the compression comprises threading a set screw through the housing with a spring retainer on the set screw in the housing for engaging the compression spring.

* * * * *